US006210168B1

(12) United States Patent
Aiger et al.

(10) Patent No.: US 6,210,168 B1
(45) Date of Patent: Apr. 3, 2001

(54) DOPPLER ULTRASOUND SIMULATOR

(75) Inventors: Dror Aiger, Tzoran (IL); Nimrod Goor, Plantation, FL (US); Mark Bergman, Kochav Yair (IL)

(73) Assignee: Medsim Ltd., Kfar-Sava (IL)

( * ) Notice: Subject to any disclaimer, the term of this patent is extended or adjusted under 35 U.S.C. 154(b) by 0 days.

(21) Appl. No.: 09/039,226

(22) Filed: Mar. 16, 1998

(51) Int. Cl.[7] ........................................ G09B 9/00
(52) U.S. Cl. ..................... 434/262; 434/267; 434/274
(58) Field of Search .................... 434/267, 266, 434/268, 262, 219; 600/454, 455; 601/2

(56) References Cited

U.S. PATENT DOCUMENTS

| 3,732,631 | * | 5/1973 | Petrovick .............................. 434/266 |
| 4,411,629 | * | 10/1983 | Voights ................................. 434/266 |
| 5,031,187 | * | 7/1991 | Orenstein et al. ..................... 434/262 |
| 5,365,929 | | 11/1994 | Peterson . |
| 5,513,992 | * | 5/1996 | Refait ................................... 434/267 |
| 5,609,485 | * | 3/1997 | Bergman et al. ..................... 434/262 |

\* cited by examiner

Primary Examiner—Joe H. Cheng
(74) Attorney, Agent, or Firm—Mark M. Friedman (57) ABSTRACT

A method and system for simulating, on a B-mode ultrasound simulator, a D-mode and C-mode Doppler ultrasound examination. Velocity and sound data describing blood flow at selected locations within blood vessels of a patient are gathered during an actual Doppler ultrasound examination. The gathered data are processed off-line to generate sets of flow velocity and sound values which describe blood flow at selected locations in a virtual B-mode frame buffer, and are stored in memory. Doppler simulation at a designated location on a the B-mode image generated from the virtual frame buffer is achieved by performing bilinear interpolation, at the time of simulation, from the data stored in memory, so as to determine flow velocity and sound values for all designated virtual frame buffer voxels. The interpolated flow velocity values are depicted as either a gray scale Doppler spectral waveform or a color scale flow map on the screen of the B-mode ultrasound simulator, and the sound values are depicted as an audible signal simulating a Doppler sound waveform.

13 Claims, 11 Drawing Sheets

| -1 | -2 | -1 |
|----|----|----|
| -2 | 5  | 1  |
| 1  | -1 | -2 |

DOPPLER ULTRASOUND SIMULATOR

FIELD AND BACKGROUND OF THE INVENTION

The present invention relates to the field of medical simulation and, in particular, it concerns a device and method for achieving simulation of a Doppler ultrasound examination.

It is well known that a complete ultrasound interrogation of any part of the cardiovascular system includes both imaging of the physical structure of the tissues being examined, as well as interrogation of the nature of blood flow through the blood vessels or heart valves being examined. Two dimensional imaging is achieved by means of "B-mode" ultrasound imaging, in which a two-dimensional gray-scale image of the tissues being examined is generated. However, the nature of blood flow (i.e. it's velocity), cannot be depicted by B-mode imaging, and for this purpose C-mode and D-mode ultrasound imaging, both of which utilize the Doppler principle, are used.

Doppler ultrasound uses the Doppler effect created by moving objects, such as blood cells which are flowing through a blood vessel, to depict flow information. The Doppler effect consists of an acquired change in frequency of an ultrasound wave which occurs when the ultrasound wave is reflected off of a moving object. If the initial frequency of the ultrasound wave is known, then the velocity of the moving reflector can be inferred from the Doppler shift acquired by the reflected wave. By measuring the Doppler shift acquired by ultrasound waves focused on a blood vessel, a "Doppler spectral graph" can be generated, which plots the velocity of blood flow against time for a single location in the blood vessel. This is known as D-mode ultrasound imaging.

In C-Mode (or Color Flow) the Doppler shift created by the movement of blood cells at a particular location in a B-mode image is depicted on a color scale at that location. The location on the B-mode image at which C-mode color data is mapped is demarcated by a graphic box, also referred to as a "color box", which is positioned by the user at the desired location on the B-mode image. C-mode imaging can thus depict blood velocity data for a multitude of points simultaneously, and generate a dynamic color image which is displayed over the B-Mode (gray-scale) image of the same area.

Figure 1:
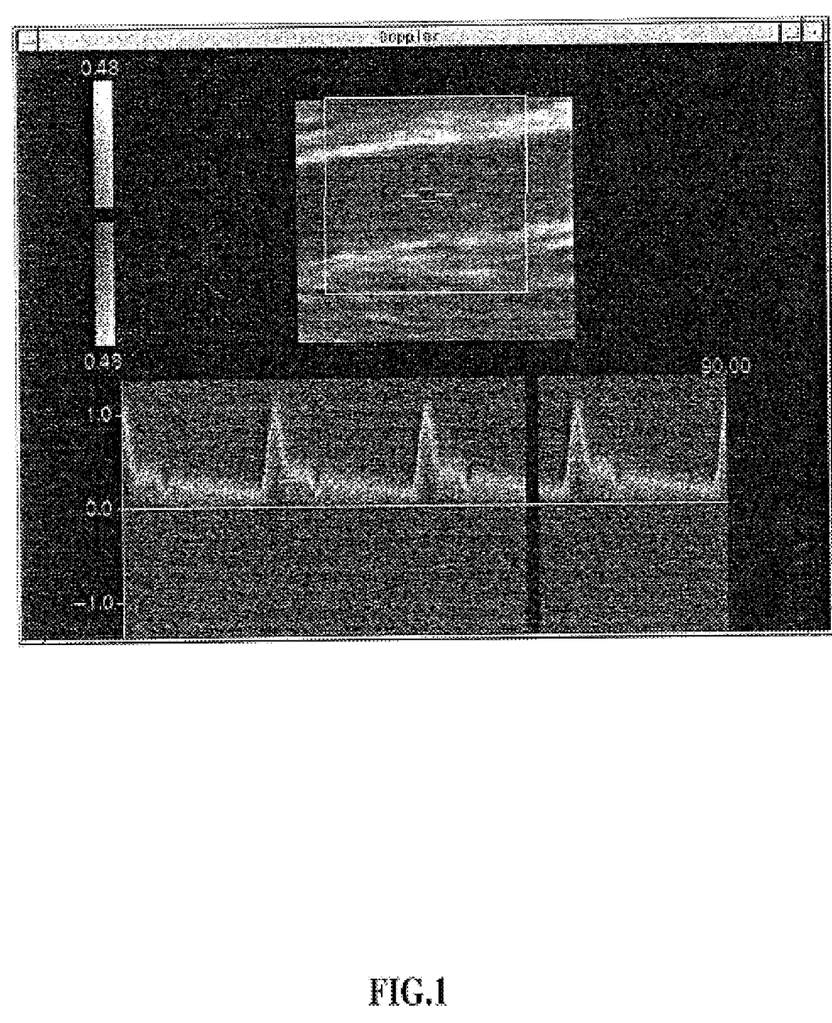
FIG. 1 is an example of a simulated D-mode spectral waveform and the corresponding B-mode image of the vessel under interrogation.

To perform D-Mode imaging, the user first marks the desired measurement location (which is also referred to as the "sample volume" or "gate") with a cursor on the B-Mode or C-Mode image. D-mode imaging is then initiated by the user by activating the appropriate control on the ultrasound machine. Additional manipulations, such as marking the estimated direction of blood flow and adjusting the ultrasound gain, compress and/or aliasing limit, are manually performed by the operator so as to optimize the spectral Doppler waveform. FIG. 1 shows an example of a D-mode Doppler spectral graph (in the lower half of the figure) and the corresponding B-mode image and sample volume at which the spectral graph was acquired (in the upper half of the figure).

As the measured Doppler frequency shift at any instant in time is usually within the audible range, the measured signal is also depicted as an audible sound of that frequency. This sound helps the user to optimize the sample volume position within a blood vessel, to differentiate between different vessels, and to identify the presence of pathology.

Performance of a Doppler ultrasound examination is thus complex, and requires that the user be highly proficient at hand-eye coordination when manipulating the ultrasound probe and the many controls involved. In addition, the user must be familiar with a wide range of pathologies, and must understand the physical principles behind the Doppler shift and its measurement by means of ultrasound. Intensive training, and much experience, are therefore required before an ultrasound technician, or a physician who uses ultrasound, achieves competency in performing Doppler ultrasound examinations.

The training of physicians and technicians in the use of Doppler ultrasound techniques is currently performed on actual patients. This system suffers from several limitations:
1. The time available for hands-on training on a given patient or pathology is limited. As such, students are not free to spend as much time as they may require on a particularly difficult or interesting case, particularly if the case is an urgent one. In addition, experimentation by the trainee with different ways of performing the same examination is not always feasible.
2. The level of training varies depending on the teacher and the availability of patients.
3. Rarer pathologies are often not encountered at all during training.
4. Hands-on training can only take place in clinical settings and at times when patients are available, rather than at times and locations which are most convenient to the teacher and trainee.

Furthermore, the accreditation process for sonographers is problematic when real patients must be used, for the following reasons:
1. There is no consistency from exam to exam. One pupil may thus get a very difficult case, whereas another will have an easier one.
2. The scoring of an exam by an examiner is subjective.
3. Appropriate patients with varied pathologies may not be available for examination purposes.

There is therefore a need for a method of realistically simulating Doppler ultrasound examinations, such that trainee sonographers can perform Doppler ultrasound examinations without the presence of an actual patient. Such a system would allow trainees to learn at an optimal location, time, and pace, and under standardized conditions. Trainees could thereby be exposed to an appropriate variety of pathologies, be they common or rare. Furthermore, such a system would allow for standardized and objective testing of trainee sonographers.

SUMMARY OF THE INVENTION

The present invention is a Doppler Ultrasound Simulator. Upon encountering the simulator the trainee sees what appears to be a real ultrasound machine with its accompanying transducers, and a mannequin on a bed, which is the trainee's "patient". The trainee performs an ultrasound examination on the mannequin using the mock transducer and simulated ultrasound machine. In reality, no sound waves are generated by the ultrasound machine. Rather, the "ultrasound machine" is actually a computer which processes pre-collected ultrasound data in accordance with the movement of the mock transducer and the manipulations of the machine's controls, as performed by the user, to display a simulated ultrasound image on the screen of the machine. The system is interactive in real time, providing the trainee with the opportunity to explore the anatomy as if an actual patient were present, and adjust the controls of the machine as would be done on a real ultrasound machine. The operator can thus practice performing ultrasound and Doppler ultrasound examinations in conditions very similar to real life.

The Doppler ultrasound simulator described herein is based on the ultrasound visual simulator (also referred to as B-Mode ultrasound simulator) described in U.S. Pat. No. 5,609,485 to Bergman et al, which is incorporated herein by reference. The B-mode ultrasound simulator achieves two-dimensional ultrasound simulation, but does not simulate D-mode and C-mode Doppler ultrasound imaging at all.

In the current invention, in an off-line preprocess, a volume buffer is generated from real ultrasound images. This buffer includes B-Mode data as well as blood flow information within the scanned area. Simulated B-Mode images are generated by slicing the volume buffer on-line, as described in U.S. Pat. No. 5,609,485. Additional processing of the previously acquired blood flow information is required to generate simulated C-Mode and D-Mode images. Such images are generated very rapidly, including post-processing enhancements, and produce images which are indistinguishable from real ultrasound images. In order to decrease memory consumption, and due to the impracticality of acquiring blood flow information for every point within the B-mode volume, flow velocity vectors are not specifically acquired for each point within the scanned B-mode volume. Instead, flow velocity vectors at only a limited number of selected points within the B-mode volume are saved, and interpolation is used to determine the appropriate flow velocity vectors for all other points within the viewed slice of the B-mode volume, when performing D-mode and C-mode simulation. The flow velocity vector for any location within the B-mode volume is thus calculated by interpolation from known flow velocity vectors for neighboring locations within the B-mode volume. By "neighboring" is meant that the locations for which the flow velocity vectors are known are in proximity to, but not coincident with, the location for which a flow velocity vector is being interpolated.

According to the teachings of the present invention there is therefore provided a Doppler ultrasound simulation system, including a B-mode ultrasound simulator, operative to generate and display a simulated B-mode ultrasound image of a fluid filled viscus; a memory unit, operative to store velocity data describing a flow of the fluid at a plurality of locations within the viscus; and a processor, operative to: i) designate a location on the B-mode image, ii) select at least one of the stored velocity data, the selected velocity data describing a velocity of fluid flow at a location, within the viscus, related to the designated location, and iii) determine an output for display on the B-mode ultrasound simulator, the output describing a velocity of fluid flow at the designated location. There is further provided a Doppler ultrasound simulation method, including the steps of providing velocity data describing a flow of fluid at a plurality of locations within a fluid-filled viscus; storing the velocity data; generating a simulated B-mode ultrasound image of the viscus; designating a location on the generated image; selecting at least one of the stored velocity data, the selected velocity data describing a velocity of fluid flow at a location, within the viscus, related to the designated location; and determining an output, from the selected velocity data, describing a velocity of fluid flow at the designated location.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a Doppler ultrasound simulator.

The principles and operation of a Doppler ultrasound simulator, according to the present invention, may be better understood with reference to the drawings and the accompanying description.

Figure 2:
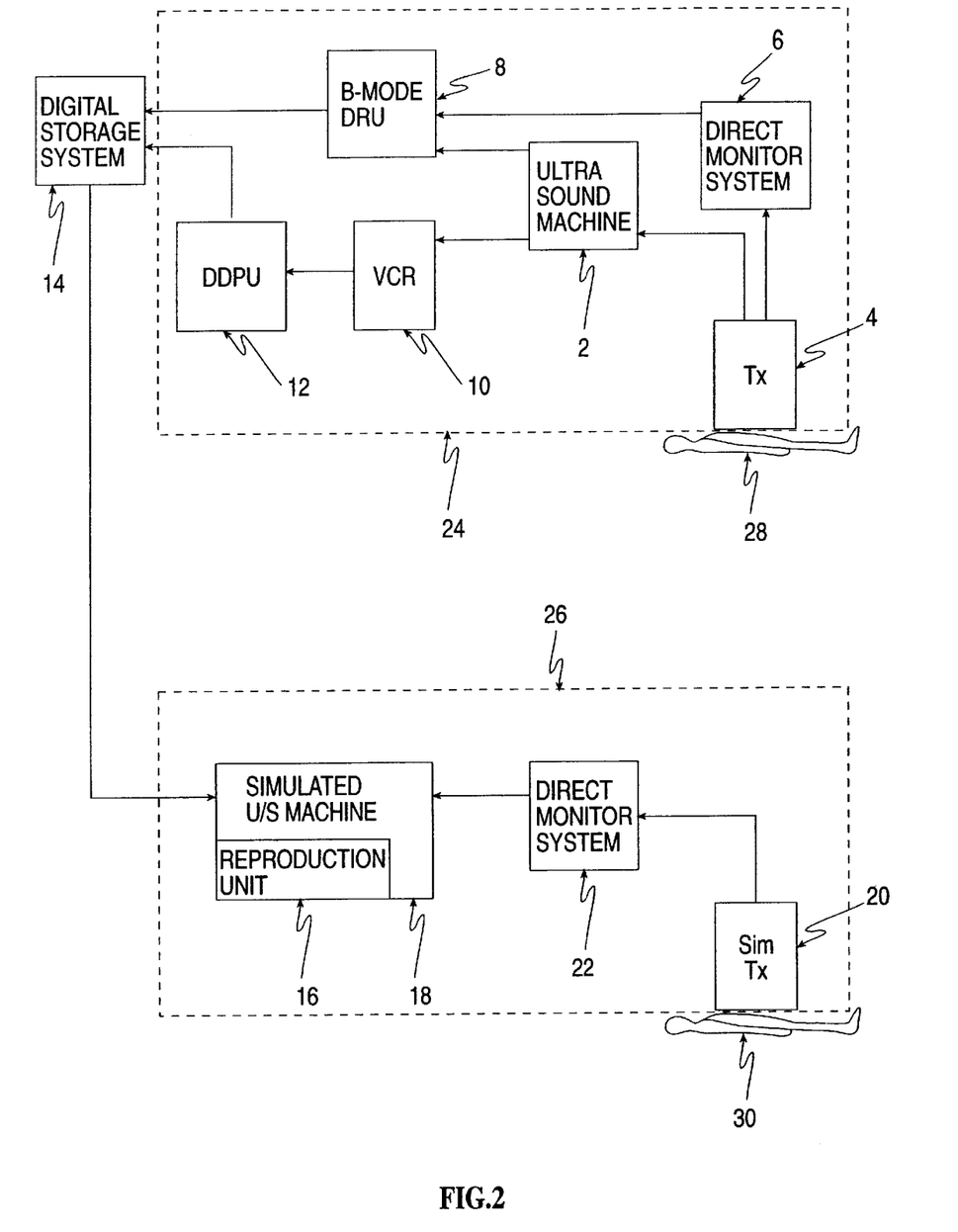
FIG. 2 is a block diagram illustrating the overall structure of the Doppler ultrasound simulator.

Referring now to the drawings, FIG. 2 illustrates the overall design of the Doppler ultrasound simulator. The implementation of the Doppler ultrasound simulator is based on the B-mode ultrasound simulator described in U.S. Pat. No. 5,609,485. As such, detailed description of B-Mode implementation, including B-Mode image generation and B-Mode functions, will not be presented in detail. As shown in FIG. 2, the components of the Doppler ultrasound simulator can be grouped into a data collection and processing unit 24, a Doppler ultrasound simulation unit 26, and a portable digital storage system 14, such as an optical or compact disk system.

The components of data collection and processing unit 24 are:

1) a standard Doppler ultrasound machine 2,
2) a specialized Doppler ultrasound transducer (Tx) 4,
3) a transducer directionality monitoring system 6,
4) a B-mode data reception unit (BDRU) 8,
5) a video cassette recorder (VCR) 10, and
6) a Doppler data processing unit (DDPU) 12.

The components of Doppler ultrasound simulation unit 26 are:

1) a reproduction unit 16 housed in a simulated Doppler ultrasound machine 18
2) a simulated Doppler ultrasound transducer (sim Tx) 20
3) a "simulated transducer" directionality monitoring system 22

Data collection and processing unit 24 is used to collect and process Doppler and B-mode ultrasound data from a patient 28 who is undergoing an actual Doppler ultrasound examination. The processed data is then transferred to Doppler ultrasound simulation unit 26 via digital storage system 14. Doppler ultrasound simulation unit 26 then uses the data stored on digital storage system 14 to simulate a Doppler ultrasound examination of patient 28, performed by an operator using simulated Doppler ultrasound machine 18 and simulated Doppler ultrasound transducer 20 on a mannequin 30.

Data Collection

Three types of data are collected by Doppler ultrasound machine 2 during the course of an actual Doppler/B-mode ultrasound examination of live patient 28, and then, at a later date, utilized by Doppler ultrasound simulation unit 26 to simulate a Doppler examination of patient 28. The types of data are B-mode image data, blood flow velocity data, and Doppler sound data.

B-mode data is acquired by Doppler ultrasound machine 2, the transducer of which (Doppler ultrasound transducer 4) is equipped with 6-DOF directionality sensors which are part of transducer directionality monitoring system 6, as described in U.S. Pat. No. 5,609,485. The B-mode data, and it's accompanying directionality data, are directly input into B-mode data reception unit (BDRU) 8 for processing.

Figure 3:
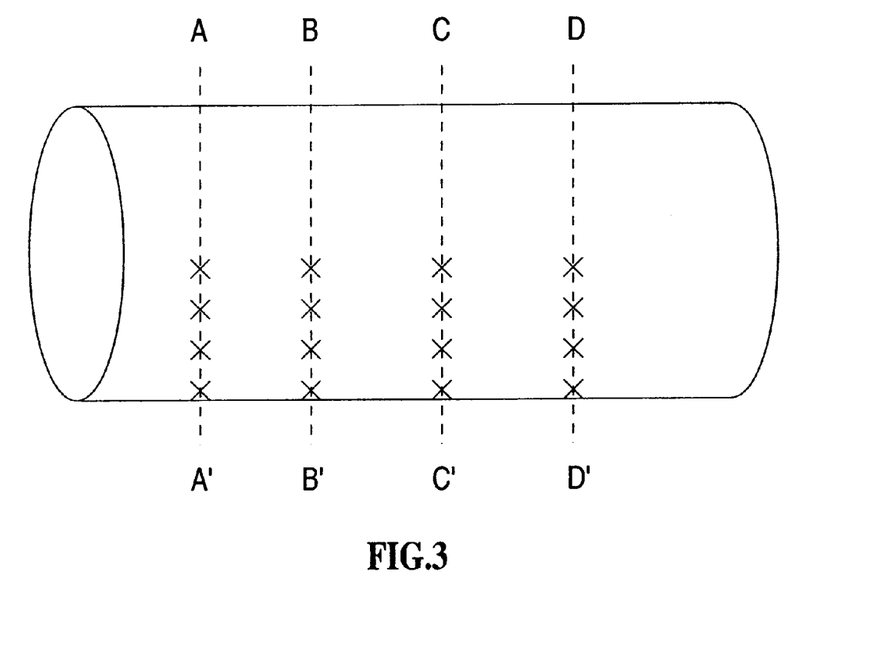
FIG. 3 illustrates four typical cross sectional locations at which Doppler spectral samples are acquired in a vessel segment under examination.

Blood flow velocity data, in the form of Doppler spectral measurements, are sampled at multiple locations within each vessel being interrogated, and stored on a video tape in video cassette recorder 10, as is standard practice during Doppler examinations. In the preferred embodiment, each vessel segment is examined at a minimum of four cross sectional locations (A-A', B-B', C-C', and D-D', as illustrated in FIG. 3), with four Doppler spectral samples being acquired at each cross section (each indicated by a mark "x" in FIG. 3), such that a total of sixteen separate samples are acquired for each vessel segment. By "vessel segment" is meant a linear, non-branched and non-curved portion of a blood vessel. A blood vessel which is tortuous or which branches is therefore broken down into it's component "segments" before it is decided where to position the sample volume for acquisition of Doppler spectral samples. Ideally, data acquisition cross sections are positioned within, immediately proximal to, and immediately distal to any significant vessel stenosis or dilation within a vessel sement.

Figure 4:
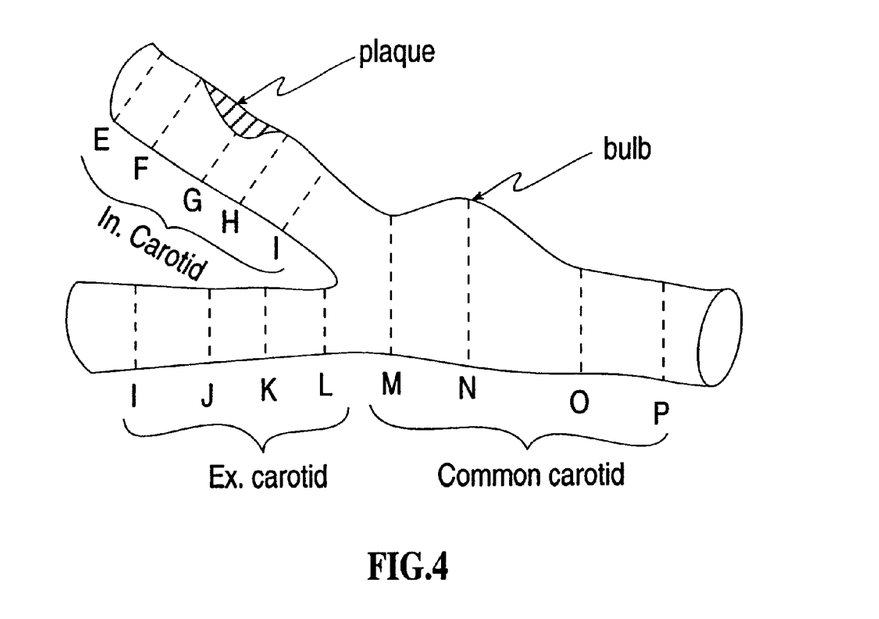
FIG. 4 illustrates typical segmentation of a branched artery under examination.

FIG. 4 demonstrates how a typical branched artery (in this example, the carotid artery) might be segmented. Note that the common carotid, the internal carotid, and the external carotid arteries each constitute a different vessel segment. The vessel cross sections at which spectral samples are acquired are indicated by broken lines. Note that cross section G is positioned within a stenosis caused by a plaque in the wall of the internal carotid artery, while cross section N is positioned within the dilation of the carotid bulb. The Doppler spectral samples are stored on a video tape along with B-mode or C-mode images which show the location of the Doppler sample volume at the time that each Doppler sample was obtained.

Doppler sound data, in the form of Doppler sound signals acquired concomitantly with Doppler spectral samples during the actual examination, are stored on a video tape along with the corresponding spectral samples. Ideally, at least two sound samples are recorded at each of the four designated cross sections per vessel segment, resulting in 8 acquired Doppler sound samples per vessel segment.

Data Processing and Data Structure Generation

Figure 5:
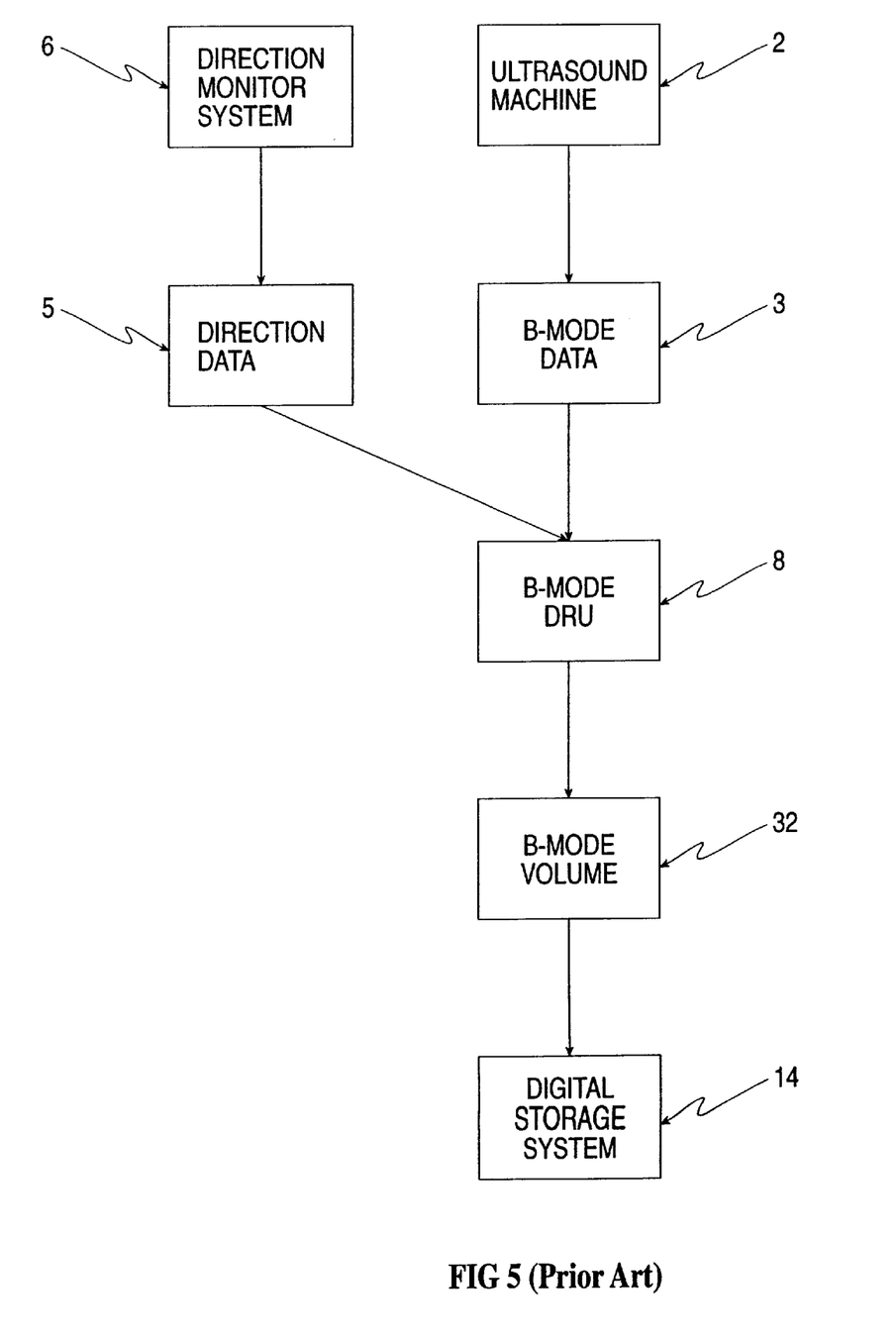
FIG. 5 is a block diagram of the scheme of B-mode data processing.

FIG. 5 is a block diagram of the scheme of B-mode data processing. B-mode DRU 8 processes the B-mode data 3 received from Doppler ultrasound machine 2, and transducer directionality data 5 received from transducer directionality monitoring system 6, to produce a three dimensional virtual frame buffer B-mode volume 32 (in a manner identical to that described in U.S. Pat. No. 5,609,485). In this volume a gray-scale value is assigned to each voxel. B-mode volume 32 is stored on digital storage system 14, and is subsequently used by Doppler ultrasound simulation unit 26 to generate simulated B-mode images (in a manner identical to that described in U.S. Pat. No. 5,609,485) and C-mode images. Digital storage system 14 is preferably a storage drive and medium such as an optical or compact disc.

Figure 6:
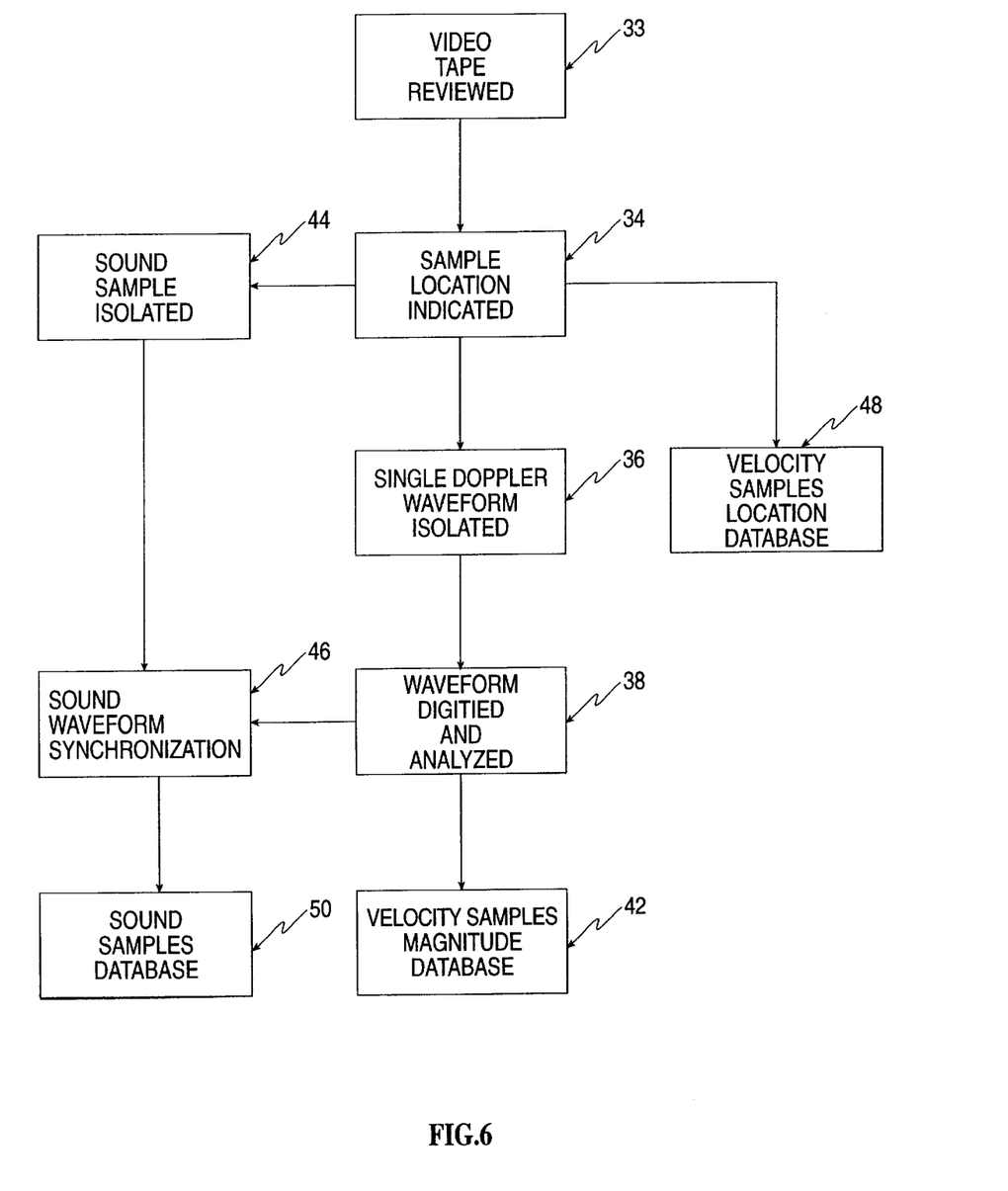
FIG. 6 is a block diagram of the scheme of Doppler spectral and sound data processing.

The scheme of data processing for the videotaped Doppler spectral and sound data is illustrated in FIG. 6. The videotape containing the Doppler blood flow velocity and sound data is used as an analog input into Doppler data processing unit 12. DDPU 12 processes the spectral and sound data to produce the data structures used later by Doppler ultrasound simulation unit 26.

Each recorded spectral velocity sample is analyzed individually. The analog data input from the video tape is reviewed 33, on the display of DDPU 12, by an operator (or team of operators) who is familiar with the actual Doppler examination at which the data was acquired. The operator simultaneously reviews B-mode volume 32 while reviewing the videotape of the actual examination, and manually indicates 34, on the B-mode volume, the location at which the spectral waveform currently being processed was acquired. This process results in the generation of a velocity samples location database 68. The operator then isolates 36 a single Doppler spectral waveform representing one cardiac cycle, from the recorded series. This waveform is then manually digitized and analyzed 38 by a spectral data generator software application in DDPU 12. The software application takes as input an image containing one waveform, and then determines and registers the minimum and maximum blood flow velocity values at each of 120 time-points during the waveform, and the lowest value on the velocity scale where the wave was cut. The registered data is then combined with velocity samples location database 68 and stored as a velocity samples magnitude database 42 in a memory unit. Each velocity sample in velocity samples magnitude database 42 thus includes 120 pairs of minimum and maximum velocity values, and the appropriate voxel location within B-mode volume 32 corresponding to the actual point of Doppler interrogation for those velocity values.

For each recorded spectral sample, a sound sample depicting one cardiac cycle is isolated 44 by the operator. This sound sample is synchronized 46 with its corresponding spectral waveform by designating the highest frequency of the sound sample as being chronologically coincident with the maximum velocity of the corresponding spectral waveform. This is achieved by a sound cutter software utility. The sound cutter software utility graphically displays the relevant spectral waveform and the corresponding sound waveform. A section of the sound waveform that matches the spectral waveform is then manually cut, according to the graphical representation. The resultant synchronized sound sample is then stored as part of a sound samples database 50 in a memory unit.

Figure 7:
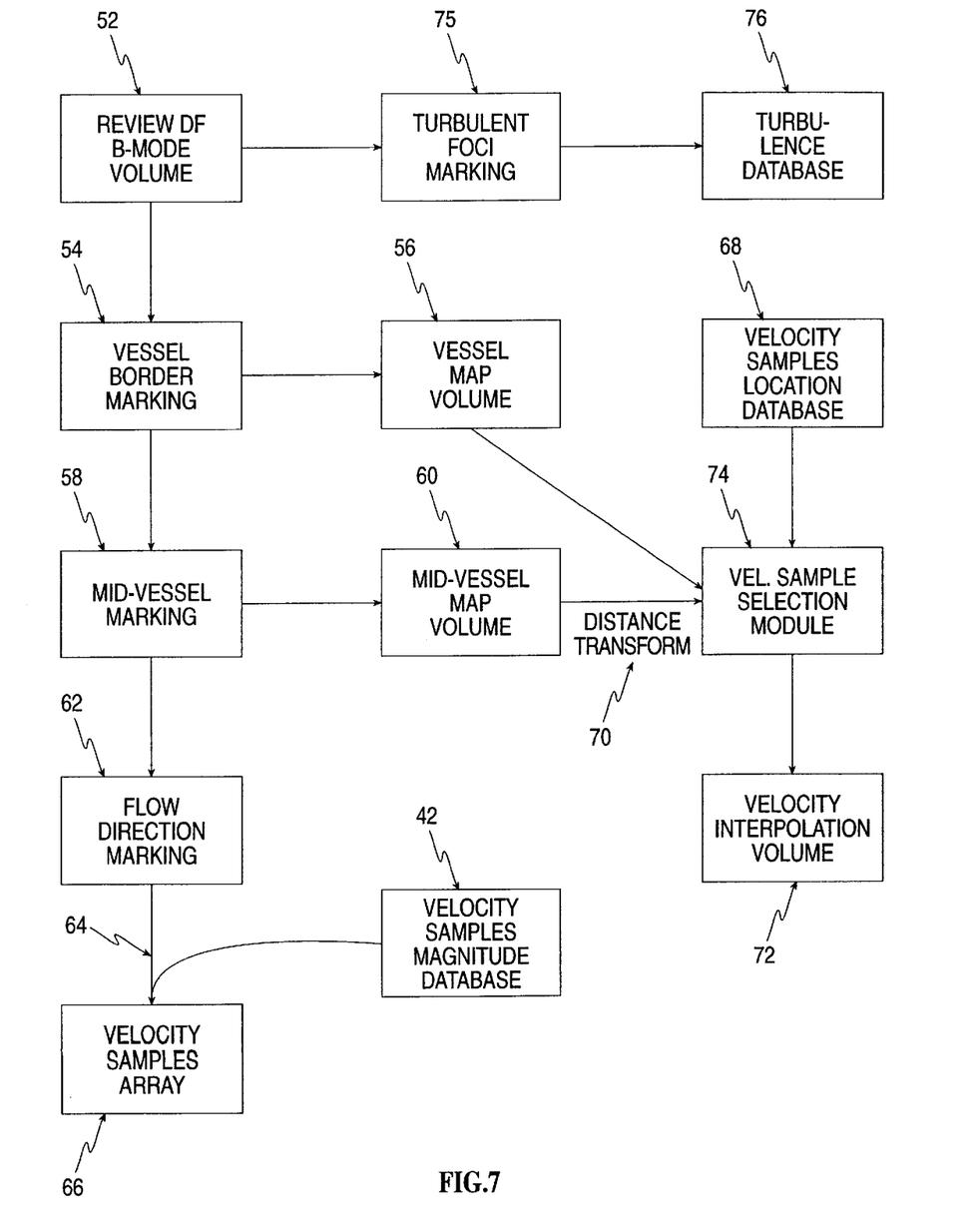
FIG. 7 is a block diagram of the scheme of data processing by a data collection and processing unit to generate a velocity samples array, a velocity interpolation volume, and a turbulence database.

The next step in the scheme of data processing by data collection and processing unit 24 is the generation of a velocity samples array 66, and is outlined as a block diagram in FIG. 7. B-mode volume 32 is reviewed 52 by the operator, and the borders of each vessel segment contained within B-mode volume 32 are manually digitized 54 in their short axis at several locations. A vessel marking algorithm in DDPU 12 then automatically marks all vessel borders contained within B-mode volume 32. The vessel marking algorithm receives two different images and generates a series of n interim images that create a smooth connection from one image to the next. The interim images are calculated using interpolation between the original two images, so as to calculate the slices falling between the hand marked slices. An example of an algorithm suitable for use as the vessel marking algorithm is disclosed in Gabor T. Herman, Jingshen Zheng and Carolyn A. Bucholtz, *IEEE Computer Graphics and Applications,* May 1992, volume 12, number 13, pp 69–79. Thus, by a process of shape-based interpolation, the vessel marking algorithm generates a vessel map volume 56. Each voxel of vessel map volume 56 is then marked as being either within or without the lumen of a vessel by means of a binary process.

In a manner similar to that described above for the marking of vessel borders, the midlines of all vessels contained within B-mode volume 32 are automatically marked 58, to generate a mid-vessel map volume 60. For each vessel segment analyzed, the operator assumes that flow within the vessel is parallel to the vessel midline, and marks 62 the direction of flow for each segment based on what was observed during the actual Doppler ultrasound interrogation of each segment. The resultant flow direction data is then combined 64 with velocity samples magnitude database 42 to create a velocity samples array 66. Velocity samples array 66 thus stores flow velocity data entries for a relatively small number of locations within B-mode volume 32. These flow velocity data entries are later used to interpolate flow velocity vectors at all other voxels within B-mode volume 32. Each entry in velocity samples array 66 contains data of a single velocity sample, including the sample position (within the scanned volume), velocity direction (as a unit vector) and a set of 120 measured minimal and maximal velocities representing the minimum and maximum velocities at each of 120 time points during one cardiac cycle.

The next step in the scheme of data processing by data collection and processing unit 24 is the generation of a velocity interpolation volume 72. First, a distance transform is performed 70 on mid-vessel map volume 60. This transform calculates the distance from each point in B-mode volume 32 to the nearest point in mid-vessel map volume 60. The resulting data, as well as the contents of velocity samples location database 68 and the contents of vessel map volume 56, are input into a velocity samples selection module 74. This module selects, for each individual voxel in B-mode volume 32, the location of the most appropriate velocity samples from velocity samples array 66 to be used for velocity vector interpolation, and calculates two "interpolation weights" to be used in that interpolation. The output of velocity samples selection module 74 is velocity interpolation volume 72. Every voxel within velocity interpolation volume 72 thus matches the corresponding voxel within B-Mode volume 32. However, whereas each voxel within B-mode volume 32 is assigned a gray-scale value, each voxel within velocity interpolation volume 72 is assigned with six numbers, to be used for velocity interpolation calculations. Four of the numbers indicate four entries in velocity samples array 66 which will be used to perform interpolation of an unknown velocity vector, and two of the numbers are the interpolation weights which will be used in the interpolation calculations.

Figure 8:
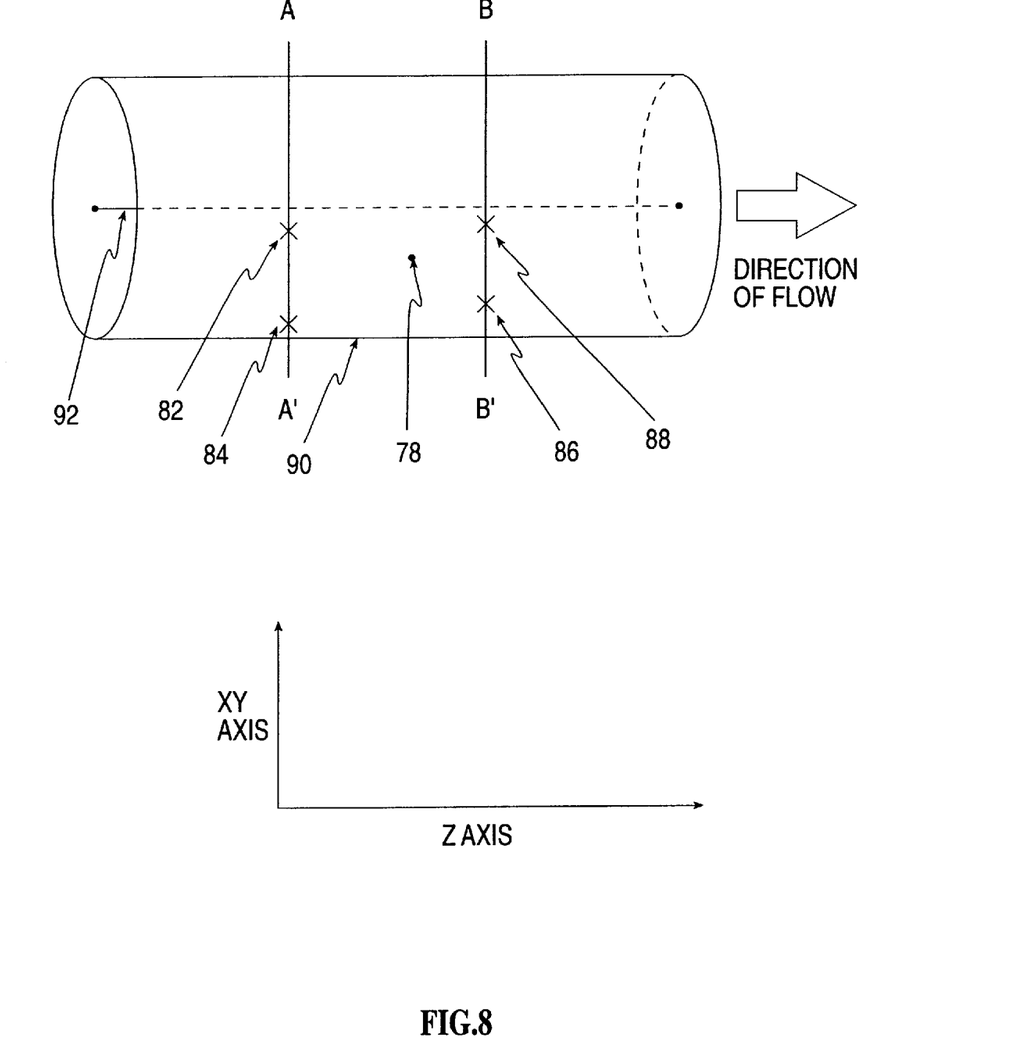
FIG. 8 is a diagram illustrating the principles of velocity vector interpolation.

FIG. 8 illustrates the principles of velocity vector interpolation. Velocity vector interpolation, as performed by Doppler ultrasound simulation unit 26, is based on several hemodynamic assumptions regarding blood flow through a segment 90 of a blood vessel. Segment 90 is assumed to be circular in cross section and not curved. Flow is considered to be maximal along the midline 92 of the vessel, and is assumed to be symmetrical around midline 92 such that at any given short-axis cross-section of segment 90, flow velocity will be identical for all points at the same distance from midline 92. Based on these assumptions, the flow velocity vector at any point 78 within segment 90 can be calculated by bilinear interpolation from four velocity vectors describing blood flow at four points 82, 84, 86, and 88, two located at a vessel cross-section which is proximal (cross-section A-A') and two at a vessel cross-section which is distal (cross-section B-B') to point 78. Thus, for a given voxel in B-mode volume 32, velocity samples selection module 74 selects the location of the four velocity samples stored in velocity samples location database 68 which are closest to the voxel in question, for entry into velocity interpolation volume 72. The locations stored in velocity samples location database 68 are identical to those stored in velocity samples array 66.

Two interpolation weights, which describe the relative location of point 78 in relation to the locations of the four known velocity vectors, are also necessary for performance of bilinear interpolation—one interpolation weight to describe the relative location of point 78 along the Z-axis of the segment (i.e. it's relative location between cross section A-A' and cross section B-B' in the long axis of segment 90), and a second interpolation weight to describe the relative location of point 78 along the XY-axis of the segment (i.e. it's relative location between point A and point A' within cross section A-A', which is the same as it's relative location between point B and point B' within cross section B-B'). Thus, the location of point 78 is compared to that of midline 92 (the location of midline 92 is retrieved from mid-vessel map volume 60), and it's normalized distance from midline 92 is calculated. By "normalized" distance is meant that the distance is expressed as a fraction of the radius of segment 90. Locations 82, 84, 86, and 88 of each of the velocity vectors to be used for interpolation are retrieved from velocity samples location database 68, and also expressed as a normalized distance from midline 92. Finally, the difference between the normalized distance of point 78 and the normalized distance of one of points 82, 84, 86, or 88 is calculated. This calculated figure is the interpolation weight along the XY axis of segment 90. By an analogous process, the interpolation weight along the Z-axis of segment 90 is calculated, based on the ratio of the distance between point 78 and one of points 82, 84, 86, or 88, to the distance between cross sections A-A' and B-B'. For a given voxel in B-mode volume 32, velocity samples selection module 74 calculates these two interpolation weights in the manner described above, for entry into velocity interpolation volume 72. The process that is described above for the calculation of the six numbers assigned to a voxel located at point 78 in velocity interpolation volume 72 is repeated for essentially every voxel which has been designated, in vessel map volume 56, as being within the lumen of a vessel in B-mode volume 32.

The final step in the scheme of data processing by data collection and processing unit 24 is the generation of a turbulence database 76. The operator reviews B-mode volume 32 and manually indicates 75 all locations at which turbulent blood flow was noted during the Doppler ultrasound examination of patient 28. Loci of turbulence are assumed to be circular in nature. For each circular locus of turbulence, the center of the locus and its radius are marked. Each entry in turbulence database 76 thus consists of two numbers, one indicating the center of the turbulent focus, and one indicating the size of the focus, within B-mode volume 32.

The data structures stored on digital storage system 14, which serve as input to Doppler ultrasound simulation unit 26, are B-Mode volume 32, velocity samples array 66, velocity interpolation volume 72, turbulence database 76, and sound samples database 50.

Simulation

Doppler ultrasound simulation unit 26 achieves simulation of the following six elements of a real Doppler ultrasound examination:

1) B-mode imaging
2) Spectral Doppler (D-mode) depiction
3) Non-turbulent color Doppler (C-mode) imaging
4) Turbulent C-mode imaging
5) Doppler sound signal depiction
6) Doppler machine functions manipulation B-mode simulation is achieved using the hardware, software and method described in U.S. Pat. No. 5,609,485. The operator manipulates simulated Doppler ultrasound transducer 20 on mannequin 30 as if performing a real Doppler ultrasound examination. The position and spatial orientation of simulated Doppler ultrasound transducer 20 relative to mannequin 30 are sensed by simulated transducer directionality monitoring system 22, and this information is relayed to reproduction unit 16. A "slice" of voxels corresponding to the spatial orientation of simulated Doppler ultrasound transducer 20 is then extracted from B-mode volume 32. This "slice" includes all voxels in B-mode volume 32 which correspond to the anatomical structures transected by the ultrasound beam during the actual ultrasound examination of patient 28, when Doppler ultrasound transducer 4 and simulated Doppler ultrasound transducer 20 are oriented in an identical manner. The "slice" is a list of the locations, within B-mode volume 32, of voxels to be displayed. This B-mode slice will also be used for C-mode and D-mode simulation, as described below. The gray-scale value for each voxel of the slice is then displayed on the monitor of simulated Doppler ultrasound machine 18. This image is updated at a frequency of approximately ten frames per second so as to reflect dynamic changes in the orientation of simulated Doppler ultrasound transducer 20. In this manner, a gray-scale simulated B-mode ultrasound image is generated which reproduces the actual B-mode ultrasound image which would be obtained if Doppler ultrasound transducer 4 would be manipulated on patient 28 in a similar orientation to that of simulated Doppler ultrasound transducer 20. The components of the current invention are integrated into the components of the above referenced B-mode simulator.

Figure 9:
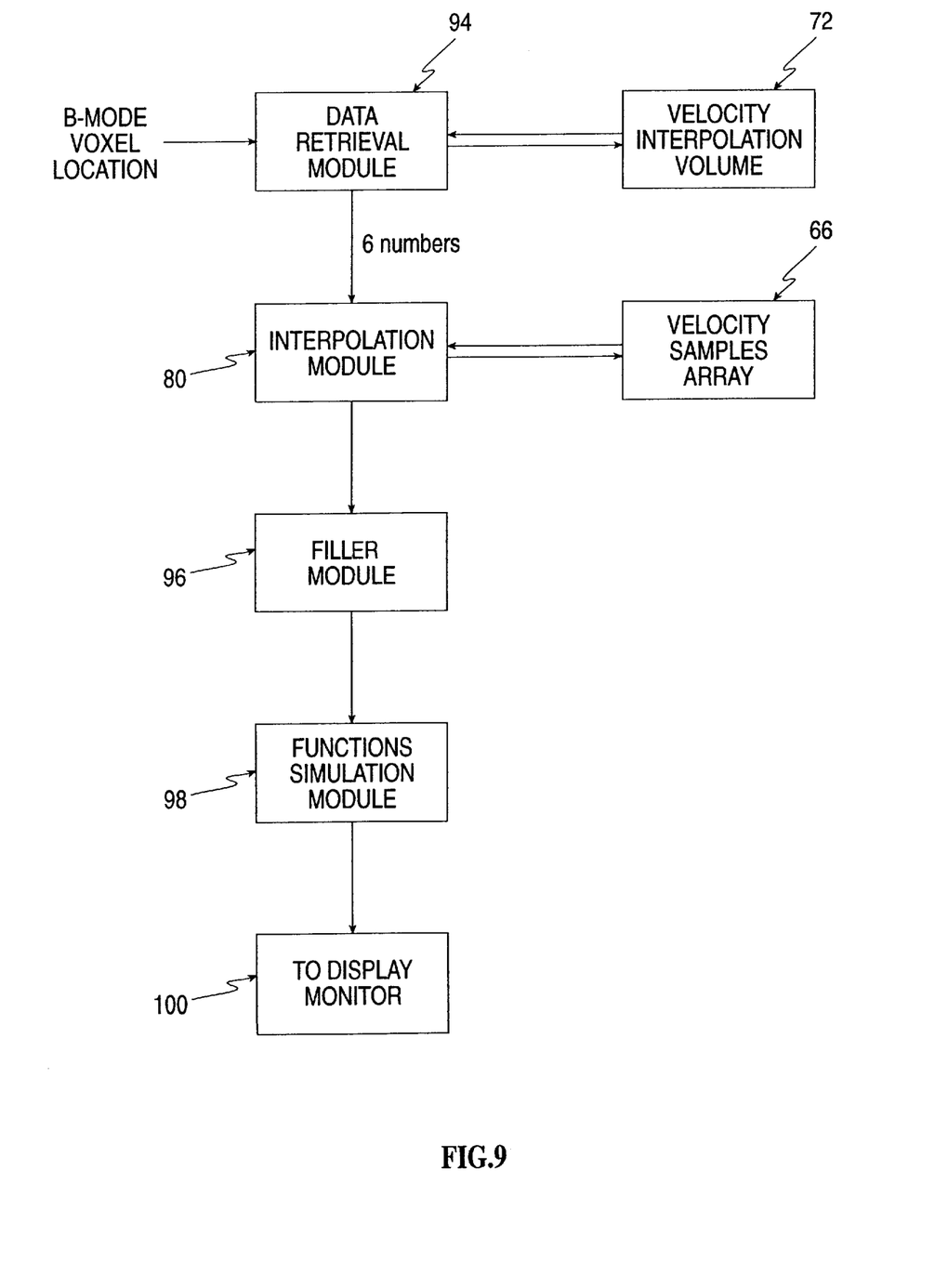
FIG. 9 is a block diagram illustrating the software modules involved in the process of D-mode simulation.

FIG. 9 illustrates the software modules within reproduction unit 16 involved in the process of D-mode simulation. D-mode simulation is achieved as follows: The operator using simulated Doppler ultrasound machine 18 positions the Doppler sample volume on the ultrasound machine cursor at a location on a B-mode or C-mode image at which the operator wishes to obtain a Doppler spectral tracing. The operator then activates the appropriate control on the control console of simulated Doppler ultrasound machine 18, to initiate the process of D-mode simulation. D-mode simulation is then performed at a frequency of approximately 100 milliseconds per simulation cycle (this being the frequency of B-mode simulation). The simulation frames are displayed in rapid succession, thus realistically reproducing a dynamic, real-time Doppler ultrasound examination.

For each simulation cycle the following data manipulations and calculations are performed by reproduction unit 16. The location and size of the sample volume on the simulated B-mode image, corresponding to a voxel (or group of voxels) in B-mode volume 32, is input to a data retrieval module 94. Data retrieval module 94 then accesses the corresponding voxel/s in velocity interpolation volume 72, and inputs data to an interpolation module 80. The data for each accessed voxel in velocity interpolation volume 72, which serve as input to interpolation module 80, define four velocity vector samples stored in velocity samples array 66, and two interpolation weights. Interpolation module 80 uses these six data inputs to perform bilinear interpolation of the minimum and maximum velocity vectors representing blood flow, at that point in time within the cardiac cycle, at the voxels located within the sample volume on the simulated B-mode image. The resultant absolute velocity vector (Va) for each voxel is then corrected for the angle between the axis of the vessel and the axis of the transducer, such that a velocity value depicting the component of the absolute velocity vector projected onto the axis of the transducer is obtained. The result of this correction is thus a calculated instantaneous velocity vector (v) for each voxel, for each point in time. The values lying between the obtained minimum and maximum values for v are automatically filled in with an empirically derived gray-scale spectrum by a gray-scale filler module 96, so as to reproduce the appearance of one "column" of a typical Doppler spectral waveform. With each successive simulation cycle, the generated "columns" form a waveform on the display of simulated ultrasound machine 18, thus simulating the spectral Doppler waveform for that location within the vessel being interrogated.

The Doppler spectral waveform generated in the manner described above can be further manipulated prior to display on the monitor of simulated Doppler ultrasound machine 18 so as to simulate all standard Doppler ultrasound machine functions. Some of the methods by which simulation is achieved are explained below. C-mode and D-mode functions simulation is implemented by an ultrasound functions simulation module 98, which accepts an input describing a desired manipulation indicated on a control panel by the user. In addition, for D-mode simulation, ultrasound functions simulation module 98 accepts as input the set of velocities corresponding to all the pixels contained within the sample volume, and outputs a grayscale column which is a component of the spectral Doppler waveform which is depicted 100 on the display monitor of ultrasound functions simulation module 98. All standard controls found on a real ultrasound machine are represented on the control panel.

Figure 10:
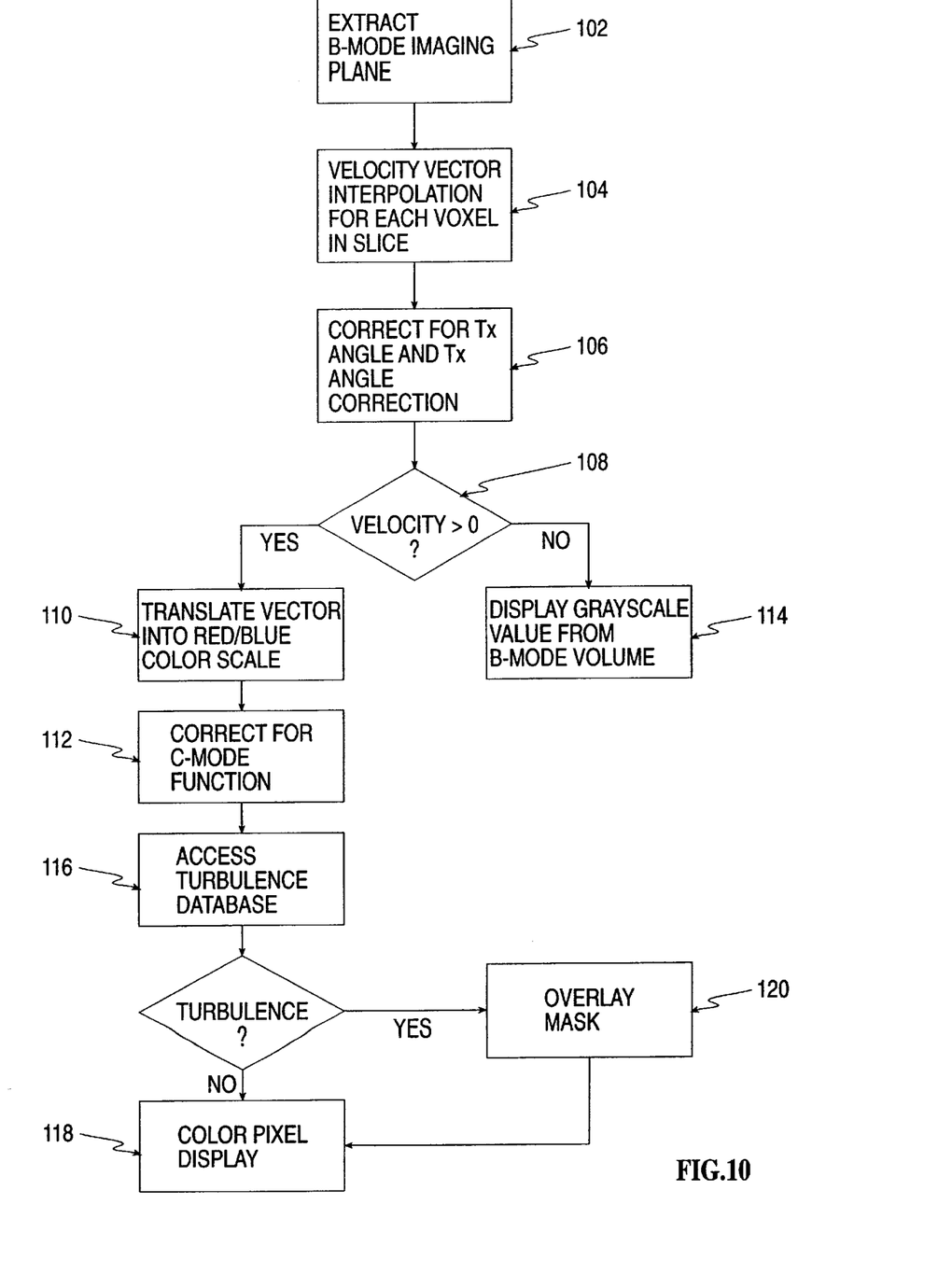
FIG. 10 is a block diagram illustrating the process of C-mode simulation.

The process of C-mode simulation is illustrated in FIG. 10. In C-Mode, a sequence of color flow images is generated, in which the velocity of blood flow is depicted on a color scale. A red color scale is traditionally used to depict blood-flow in a direction towards the ultrasound transducer, while a blue color scale depicts blood-flow in a direction away from the transducer. Different shades of blue or red quantify faster or slower velocities in the relevant direction. The operator using simulated Doppler ultrasound machine 18 positions the color box at a location on a B-mode image at which the operator wishes to obtain a C-mode image. The operator then activates the appropriate control on the control console of simulated Doppler ultrasound machine 18, to initiate the process of C-mode simulation. C-mode simulation then continues until the operator discontinues C-mode simulation. FIG. 10 summarizes the process of non-turbulent C-mode simulation per simulation cycle. At the outset of the simulation cycle, a slice of voxels corresponding to the spatial orientation of simulated Doppler ultrasound transducer 20 is extracted 102 from B-mode volume 32, as described above for the process of B-mode simulation. A blood-flow velocity vector is then interpolated 104 for each voxel contained within the color box in the slice, using the same methods and software as described above for the process of D-mode simulation. In real life, if the Doppler transducer is oriented near parallel to the direction of blood flow, the vector "seen" by the transducer will approximate the actual blood flow vector, whereas if the transducer is oriented at an angle to the actual direction of blood flow, the transducer only "sees" a projection of the actual vector onto the axis of the transducer (if the transducer is oriented perpendicularly to the direction of actual blood-flow, therefore, the transducer "sees" a projected vector of magnitude zero). The operator of a Doppler ultrasound machine is able to partially compensate for this by estimating the angle between the transducer and the actual direction of blood-flow, and indicating this angle by means of the "angle correction" (or "color box angle correction") function on the Doppler ultrasound machine control panel. Similarly, the Doppler ultrasound simulator corrects 106 the velocity vectors for each voxel, so as to accurately reflect the influence of the transducer angle and the transducer angle correction function on the velocity vector "seen" by the C-mode Doppler transducer. Doppler ultrasound simulation unit 26 then determines 108 whether the velocity vector for each voxel is greater than zero, or an alternative predefined threshold.

For those voxels in which the velocity vector is greater than zero, or an alternative threshold defined by the color gain function on the control panel, each velocity vector is translated 110 into a color scale. The resultant color value is further corrected 112 for the effect of other C-mode functions such as scale, color gain, and invert. This correction is implemented by an ultrasound functions simulation module (not shown) in a manner similar to that described above for D-mode ultrasound functions simulation. For C-mode simulation, the ultrasound functions simulation module accepts as input the velocity vector v corresponding to each pixel to be displayed, and outputs a grayscale or color value for each pixel to be displayed.

Once the corrected color value for each voxel has been determined, a turbulence simulation module (not shown) in reproduction unit 16 accesses 116 turbulence database 76, to verify if a focus of turbulence falls within the current B-mode volume slice. In the event that no turbulent focus coincides with the voxels of the current slice, the calculated color value for each voxel is displayed 118 as a color pixel on the monitor of simulated Doppler ultrasound machine 18. In the event that a focus of turbulence coincides with the voxels of the current slice, the color values of all voxels coinciding with the turbulent focus are adjusted 120 by the turbulence simulation module in accordance with a predefined color "mask", as explained below with regard to FIG. 11. After this adjustment has been made, the color value for each voxel is displayed 118 as a color pixel on the monitor of simulated Doppler ultrasound machine 18.

For those voxels in which the velocity vector is equal to zero, or is less than the threshold deined by the color gain function, the gray-scale pixel stored in B-mode volume 32 is displayed 114 on the monitor of simulated Doppler ultrasound machine 18.

The generated color image is thus overlaid on the corresponding B-Mode image; color is displayed (instead of a gray-scale value) at every point within a blood vessel in which a velocity value greater then a pre-defined threshold is detected, whereas all other points are represented by their original B-Mode gray-scale value.

Simulation of the "scale" Doppler function, that is, the function which increases or decreases the maximum velocity value which can be displayed on the simulated Doppler display, is achieved as follows:

1. For C-mode Doppler simulation, the color to be displayed at a given pixel (C) is determined by the formula $$C = \text{round}\left(\frac{v + \max vel}{2 \times \max vel}\right) \times 127 \mod 128$$

where "max vel" is the value for maximum velocity value as indicated on the scale control by the user, where "v" is the calculated instantaneous velocity for each voxel, for each point in time, and where the color range used for displaying the C-mode color map consists of 128 values (the first 64 color values being negative, or blue, and the second 64 being positive, or red).

2. For D-mode Doppler simulation, the distance (h) from the baseline (the time axis) at which v is displayed is determined by the formula $$h = \frac{v}{\max vel} \times (0.5 \times fy)$$

where "fy" is the Y axis dimension of the D-mode display, measured in pixels, and the distance between the baseline and max vel is 50% of the Y axis dimension of the D-mode display.

Simulation of the "color gain" Doppler function, that is, the function which, during C-mode simulation, increases or decreases the velocity threshold below which B-mode grayscale values are displayed instead of C-mode color values for a given voxel, and which increases or decreases the random noise within a simulated C-mode image, is achieved as follows:

1. Velocities (v) are not displayed as a color on the simulated C-mode image, and the corresponding grayscale value for the pixel is displayed instead, whenever v is less than the velocity threshold indicated on the color gain control by the user. In the preferred embodiment, this characteristic is implemented for gain values in the lower third of the scale only.

2. Random noise (noise) is increased or decreased according to the formula $$v = v + \text{noise}[x,y] \times clrGain$$

where "noise[x,y]" is an array of random noise that may be either negative or positive, and "clrGain" is the value for color gain, ranging from 0 to 1, as indicated on the color gain control by the user.

The D-mode spectral gain function alters the intensity of the graylevel display of the simulated Doppler spectral graph by increasing or decreasing the displayed graylevel value by a factor (gainAdd) according to the formula $$gainAdd = (PSgain \times 2 - 1) \times 63$$

where "gainAdd" is an addition to the grayscale value with which the simulated Doppler spectral graph is displayed, "PSgain" is a value, ranging from 0 to 1, for spectral gain as indicated on the spectral gain control by the user, and the range of gray levels used is from −63 to +63. The grayscale value to be displayed is bounded by the values of −63 to +63. The spectral waveform is further adjusted so as to simulate the effect of changes in spectral gain, by decreasing the minimum depicted velocity, and slightly increasing the maximum depicted velocity, as spectral gain is increased by the user. In addition, the intensity of the Doppler sound sample is increased as the spectral gain is increased by the user.

Adjustments of the angle of the gate indicator influence the value of the displayed velocity vector v in accordance with the formula $$Vd = |Va| \cos \alpha / \cos \beta$$

where Vd is the minimum or maximum velocity value of a column of the D-mode spectral Doppler graph, α is the angle between the axis of the transducer and the absolute velocity vector, β is the angle between the axis of the transducer and the axis of the gate indicator, and Va is the absolute velocity vector. Similarly, adjustments of the angle of the color box change the transducer vector (and therefore the value of α), thus changing the value of the velocity vector (Vc) according to the formula $$Vc = |Va| \cos \alpha$$

where "Vc" is the calculated instantaneous velocity for each voxel, for each point in time.

Changes in the shape of the D-mode spectral graph which occur in response to adjustments of the location and size of the gate (or sample volume) by the user, in an actual ultrasound machine, are simulated in the current invention by calculating the ratio of the number of voxels outside of the vessel to the number of voxels inside the vessel, for all voxels contained within the sample volume. This ratio is then used to manipulate the displayed simulated spectral waveform, such that a larger ratio is translated into a wider waveform containing lower velocities (that is, velocities approaching zero, as are found alongside the vessel wall, or zero velocity, as is found outside of the vessel). The volume of the Doppler sound sample is also adjusted according to the value of this ratio, such that a larger ratio decreases the volume of the sound sample.

Other standard Doppler functions, such as D-mode baseline position, invert, and spectral waveform measurements can be performed on the simulated Doppler display data (that is, the value of v for each pixel) by applying the similar principles and image processing techniques to those used in actual ultrasound machines.

Figure 11:
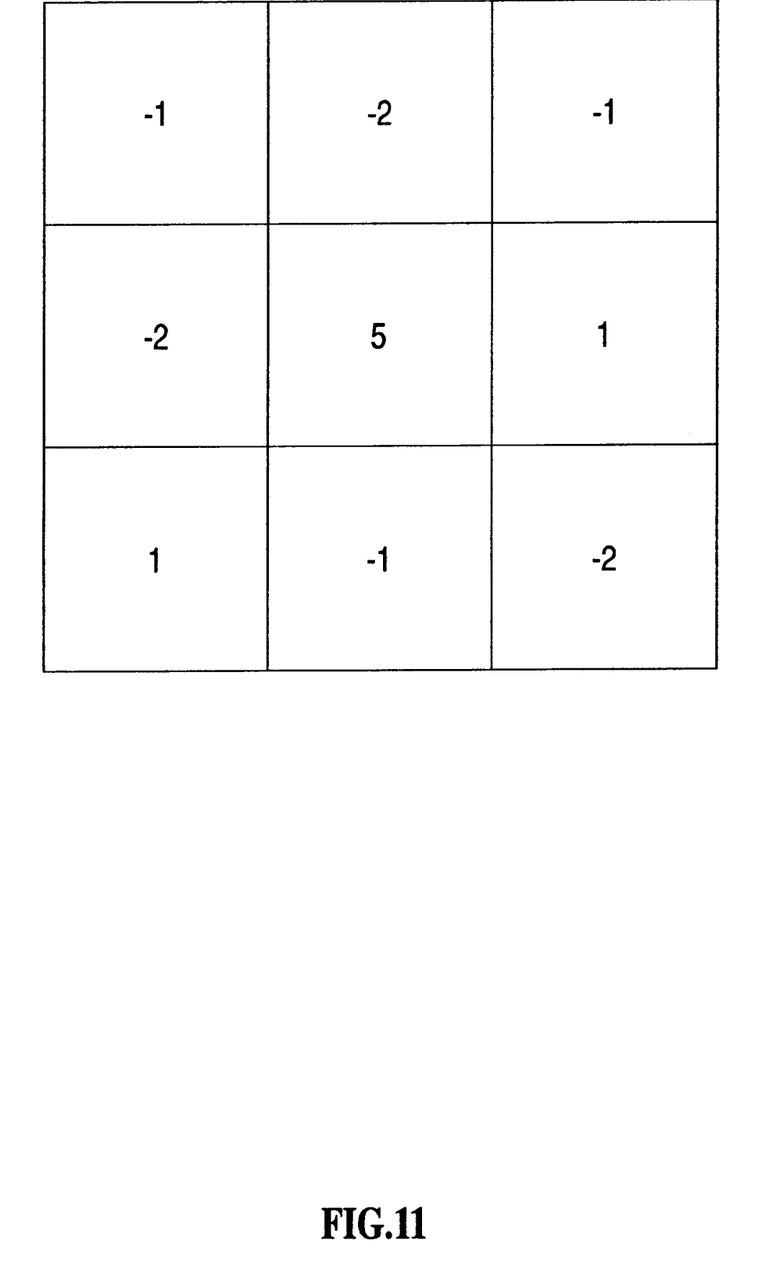
FIG. 11 demonstrates the structure of a typical "mask" used to simulate the appearance of turbulence on a C-mode image.

FIG. 11 demonstrates the structure of a typical "mask" used to simulate the appearance of turbulence on a C-mode image. The mask comprises a matrix of correction values arranged around a central pixel. The central pixel is positioned coincident with the pixel or voxel identified as being a focus of turbulance, such that the surrounding pixels of the matrix overlay the pixels/voxels surrounding the focus of turbulence. The color value of each pixel overlaid by the mask is multiplied by the value shown in that pixel of the mask, so as to generate a mosaic appearance to the C-mode image in the region of the turbulence. In the preferred embodiment, three types of masks may be overlayed, depending on whether the B-mode slice passes through the center of the turbulent focus, touches only the circumference of the turbulent focus, or is located somewhere between those two extremes, as defined by turbulence database 76. It will be understood that utilization of these masks renders a graphic simulation of C-mode turbulence which is only an approximation of the true velocity vectors within an actual turbulent jet.

Figure 12:
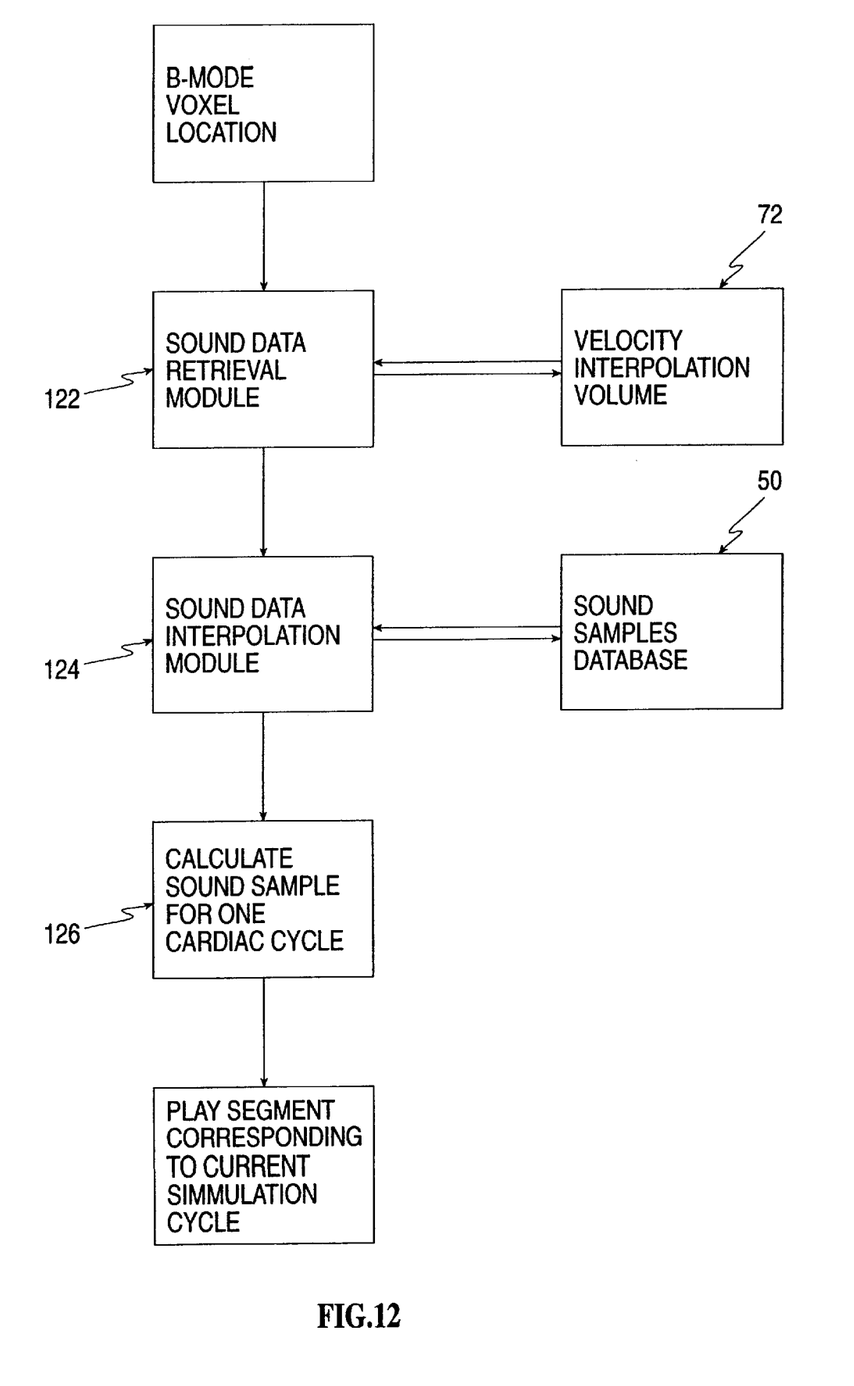
FIG. 12 is a block diagram illustrating the process of sound simulation.

The process of sound simulation is illustrated in FIG. 12. Sound simulation is achieved in a manner directly analogous to that described for D-mode simulation. For each simulation cycle the following data manipulations and calculations are performed by reproduction unit 16. The location of the sample volume on the simulated B-mode image, corresponding to a voxel in B-mode volume 32, is input to a sound data retrieval module 122. Sound data retrieval module 122 then accesses the corresponding voxel in velocity interpolation volume 72, and inputs data to a sound interpolation module 124. The data in the accessed voxel, which serves as input to sound interpolation module 124, defines four sound samples stored in sound samples database 59, and two interpolation weights. Sound interpolation module 124 uses these six data inputs to perform bilinear interpolation of the appropriate sound frequency representing blood flow, at that point in time within the cardiac cycle, at the voxel located within the sample volume on the simulated B-mode image. This process is repeated for all time-points in the cardiac cycle, such that a single sound sample lasting for the duration of one cardiac cycle is created 126. A segment of this sound sample corresponding to the length of the simulation cycle, and coordinated with the Doppler spectral frequencies currently being Simulated, is then played 128 by an audio reproduction unit (not shown).

It will be appreciated that fewer than 16 Doppler samples per vessel segment may be acquired during the process of data collection, and that other methods of interpolation (such as linear, rather than bilinear, interpolation) may be used to achieve Doppler simulation without departing from the principles and spirit of the current invention.

It will be understood that by appropriately fashioning mannequin 30 and simulated ultrasound probe 20, the system of the current invention can be used to simulate essentially any type of Doppler ultrasound examination, including trans-thoracic, trans-abdominal, trans-esophageal, intravaginal, intravascular, and endoscopic ultrasound examinations. Furthermore, although the above description has related only to the simulation of blood-flow through a blood vessel, it will be understood that the same principles can be used to simulate a flow of fluid through any hollow viscus. By "hollow viscus" is meant any hollow organ within the human body, including organs within the genitourinary tract, gastrointestinal tract, and gynecological system.

The Doppler ultrasound simulator described above increases the proficiency of physicians and sonographers by enabling them to train without the need for real patients. The simulation system enables physicians and sonographers to gain experience in dealing with complicated and/or rare pathologies while receiving instruction and feedback from experts in the field via the simulator. In addition the system provides a way for sonography schools, universities, and hospitals to standardize the accreditation process.

What is claimed is:

1. A Doppler ultrasound simulation system, comprising:
   (a) a B-mode ultrasound simulator, operative to generate and display a simulated B-mode ultrasound image of a fluid filled viscus;
   (b) a memory unit, operative to store velocity data describing a flow of said fluid at a plurality of locations within said viscus said memory unit being further operative to store sound data, said sound data describing at least one Doppler frequency shift at said plurality of locations within said viscus, and
   (c) a processor, operative to
      (i) designate a location on said B-mode image,
      (ii) select at least one of said stored velocity date, said selected velocity data describing a velocity of fluid flow at a location, within said viscus, related to said designated location, and (iii) determine an output for display on said B-mode ultrasound simulator, said output describing a velocity of fluid flow at said designated location.

2. The system of claim 1, wherein said viscus includes a blood vessel.

3. The system of claim 1, wherein said output includes a velocity value on a simulated D-mode Doppler spectral waveform.

4. The system of claim 1, wherein said output includes a color of a pixel in a simulated C-mode color Doppler image.

5. The system of claim 1, wherein said processor is further operative to iv) select at least one of said stored sound data, said selected sound data describing a Doppler frequency shift at a location, within said viscus, related to said designated location, and v) determine a sound output, from said selected sound data, depicting a Doppler frequency shift at said designated location, the system further comprising d) a sound production unit operative to generate said determined sound output.

6. The system of claim 1, further comprising d) a mechanism for designating additional manipulations of said generated output, said additional manipulations being selected from the group consisting of gain, compress, filter, scale, angle correction, and audio volume manipulations.

7. The system of claim 6, wherein said processor is further operative to iv) manipulate said generated output according to said designated additional manipulations.

8. The system of claim 1, further comprising d) a data receiving unit, operative to receive flow velocity data acquired with a Doppler ultrasound machine from a living body, and wherein said velocity data stored in said memory unit includes said flow velocity data received by said data receiving unit.

9. A Doppler ultrasound simulation method, comprising the steps of:

a) providing velocity data describing a flow of fluid at a plurality of locations within a fluid-filled viscus;

b) storing said velocity data;

c) generating a simulated B-mode ultrasound image of said viscus;

d) designating a location on said generated image;

e) selecting at least one of said stored velocity data, said selected velocity data describing a velocity of fluid flow at a location, within said viscus, related to said designated location;

f) determining an output, from said selected velocity data, describing a velocity of fluid flow at said designated location;

g) providing sound data describing at least one Doppler frequency shift at said plurality of locations within said fluid-filled viscus;

h) storing said sound data;

i) selecting at least one of said stored sound data, said selected sound data describing a Doppler frequency shift at a location, within said viscus, related to said designated location, and j) determining a sound output, from said selected sound data, depicting a Doppler frequency shift at said designated location.

10. The method of claim 9, wherein said selected sound data describe Doppler frequency shifts at locations, within said viscus, which neighbor said designated location on said generated image.

11. The method of claim 10, wherein said determining of said sound output includes inferring a sound from said selected sound data.

12. The method of claim 11, wherein said inferring includes bilinear interpolation.

13. The method of claim 9, further comprising the step of k) synchronizing said provided sound data with said provided velocity data.

* * * * *